Oct. 30, 1951      H. HEINRICH      2,573,141
PROCESS OF MOLDING A COSMETIC
Filed Dec. 11, 1947
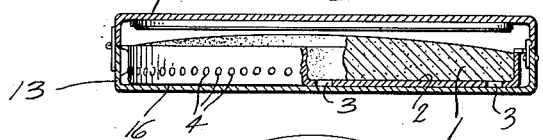
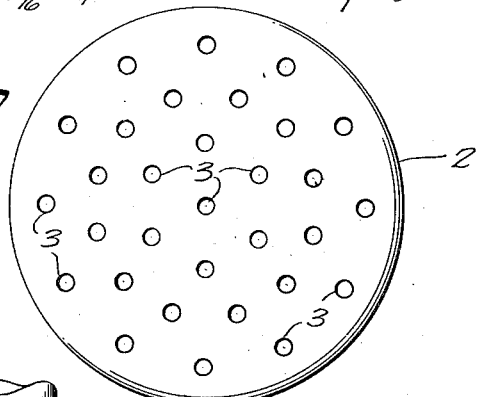
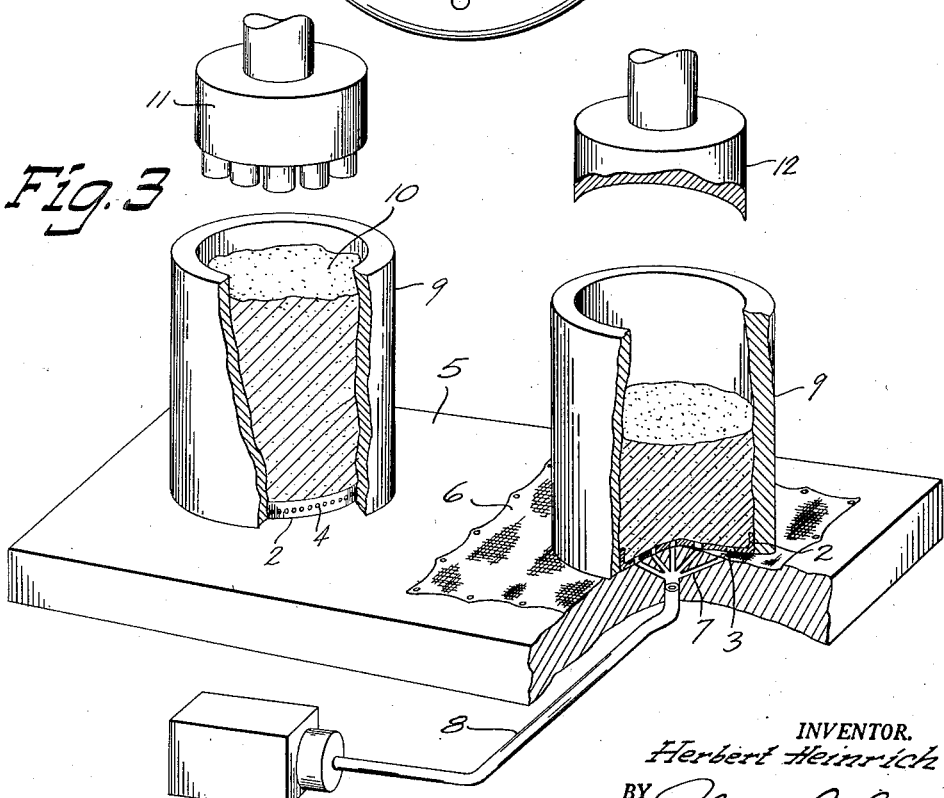
INVENTOR.
Herbert Heinrich
BY
Attorney Patented Oct. 30, 1951

2,573,141

UNITED STATES PATENT OFFICE 2,573,141

PROCESS OF MOLDING A COSMETIC

Herbert Heinrich, Milwaukee, Wis., assignor to Kolmar Laboratories, Inc., Milwaukee, Wis., a corporation of Delaware Application December 11, 1947, Serial No. 790,947

3 Claims. (Cl. 18—55)

This invention relates to a process of making a cosmetic.

It has particular relation to the compacting of dry or substantially dry powder materials as in the construction of compressed cakes of face powder and the like.

It has been the practice heretofore to employ a binder of gum arabic or the like in face powder mixtures for the purpose of facilitating compressing of the same in a pan or other suitable container. Such face powder compacts are often flaky in structure due to the striations formed therein during compressing, and they tend to break readily along the striations. When broken across the same they evidence a rough torn surface exposing the broken edges of numerous striations of binder and powder material.

Because of the flaky nature of such compacts it is necessary to use relatively low pressures in compressing the same in order to avoid lifting in the dies and separation of the material spoiling the compact.

Furthermore, compacts of this nature do not pay off like loose powder; they tend to pay off in flakes or scales which smear on the skin and are difficult to apply. Consequently, most women prefer to use a loose face powder rather than the former compact.

Binders which evaporate tend to leave the compacts porous and too weak for shipment and service.

Attempts have been made heretofore to eliminate the flakes by increasing the pressure employed in compressing the powder, but such attempts have not been acceptable commercially due largely to the entrapment of air preventing a uniform compressing of the powder and producing layers which cause lifting in the die.

Attempts to eliminate the binder and employ a substantially dry powder resulted in a great slowing down of production.

One of the prinicipal objects of the present invention is to produce a substantially dense powder cake that is uniformly compressed and which does not contain striations or flakes.

Another object is to greatly shorten the time required for pressing compacts and increases the production thereof.

Another object of the invention is to prevent lifting of a powder cake during the process of compressing and eliminate hollow compacts.

Another object is to provide a powder cake that is stronger and less susceptible to breakage.

Another object is to provide a powder cake which will pay off in particles similar to loose powder, avoiding the flaky pay-off of former cakes.

Another object is to provide larger powder cakes of more uniform texture and greater strength.

The accompanying drawings illustrate a powder cake embodying the invention and a process for the construction of the same.

In the drawings:

Figure 1 is a central transverse section through a face powder cake and container therefor, showing the cake pressed in a thin metal pan which is secured in the container;

Fig. 2 is a bottom plan view of the pan of Fig. 1;

Fig. 3 is a perspective view with parts broken away and sectioned to illustrate the apparatus and method employed in pressing the cake of Fig. 1;

The powder cake 1 constitutes a strong uniformly compressed mass of fine face powder or the like free or substantially free from binder material which would cause striations and flaking, and in which the air has been removed to a remarkable extent.

The cake 1 is strengthened and reinforced by a more rigid plate or pan 2 which extends across the bottom of the cake and preferably up the sides thereof. The pan 2 is preferably of metal, although it may be made of other materials provided that its rigidity serves sufficiently to protect the compact or other product against shock.

The pan 2 has a plurality of small openings or perforations 3 distributed throughout the bottom of the pan. If desired, there may be a series of perforations 4 spaced around the sides of the pan. Construction of the pan of a circular rim having a bottom screen may be suitable for small compacts, but is generally of insufficient rigidity for large compacts.

The number and distribution of the openings 3 and 4 is dependent upon the size and thickness of the final product. In general, perforations of from 1/64 inch to ½ inch in diameter may be employed leaving sufficient stock between perforations to maintain sufficient rigidity of the pan. Too many perforations may weaken the pan, while too few will be apt to cause entrapment of air in the powder or a longer time for pressing the compact.

In making a compact, as illustrated in Fig. 3, an empty pan 2 is placed on a press base or table 5 with a porous cloth or other suitable filter material 6 between the table 5 and the bottom of the pan. If desired, small grooves 7 may be provided in table top 5 beneath filter 6 and connected by conduit 8 to a suitable vacuum means, illustrated diagrammatically.

A cylindrical outer wall casing 9 fits over the pan 2 and constitutes an upward extension for the sides of the pan, and a retaining wall for the loose fluffy powder 10 during pressing.

After filling of the pan 2 and wall 9 with the powder mixture, the assembly is tamped until the powder mix has settled together and the voids and interstices have been substantially reduced.

For large cakes it may be desirable to prepress the powder mixture after tamping by applying thereto a separated die plunger 11 in successive strokes at different rotational positions.

The final compressing of the cake after tamping and, if desired, after pre-pressing, is accomplished by a die 12 having the desired shape of the top of the finished cake and which is then applied to the condensed powder mix under a pressure that may be as much as two thousand pounds per square inch. The face area of die 12 corresponds to the inside diameter of wall 9 and the die effects a pressing of the powder mix 10 into the cake 1.

In the pressing process the downward movement of plunger 12 first tends to condense the powder immediately beneath the face of the plunger, driving the air downwardly through the loose material ahead of the zone of pressure. This action continues progressively as the plunger 12 moves downward, and until substantially all of the air has been driven out through the bottom of pan 2.

In prior attempts, where no air escape was provided, the condensing of the powder immediately beneath the plunger face served to provide a block against the further escape of air upwardly around the plunger, and to entrap the air in the cake, forming striations and air pockets which caused lifting and greatly reduced the quality of the cake. Only by extremely slow and skillful operation, employing very slowly increasing plunger pressures, could a cake be made in the manner of such prior attempts.

During this final pressing operation the air in the interstices of the powder mix escapes through the many small perforations 3 and 4 and the porous filter 6 and the cake formed is a solid coherent mass of powder substantially devoid of interstices containing air.

For cakes of large area it may be advisable to apply a vacuum to the filter 6 through passages 9 and grooves 7, although for most compacts it has been found sufficient merely to open the passages 8 to the air, or even to eliminate passages 8 and grooves 7 and allow the air to escape through filter 6 outwardly around the edge of the pan 2.

The amount of powder entering the perforations 3 and 4 is small and it falls loosely out when the pan is removed from the press leaving very little of the powder in the perforations.

The pan 2 containing cake 1 is glued or otherwise secured in a suitable jar or container 13 and a cover 14 is applied to complete the product ready for use.

The pressure employed in the final pressing operation is generally substantially higher than pressures used with mixtures of powder containing binder material, and effects an expulsion of air from the dry powder mix so that the particles of powder are in contact with each other under conditions giving rise to a high adhesion therebetween. The softer particles are shaped against the harder particles and form a molded mass that resists separation and breakage to a high degree.

The final cake is of substantially uniform texture throughout, is substantially devoid of voids and interstices between the particles and does not embody zones or striations of weakness.

The powder is non-spillable, and yet it pays off from the cake with almost the same ease as loose powder can be picked up by the applicator.

If there is any tendency for the cake to come loose in the pan 2, a thin coating of glue 16 may be applied to the inside walls and bottom of pan 2 prior to filling the same with the powder mix and pressing the cake.

By reason of the distribution of the perforations or air outlets 6 as described it is possible to greatly increase the speed of the pressing operation and to employ high initial pressure for plunger 12. In practice it is possible with a single plunger press to make 5000 compacts in an 8 hour day, whereas without the air escape the production is considerably less.

The invention enables the employment of a substantially dry powder mix and thereby avoids flaky compacts. By reason of the substantial removal of air from the compact material a higher quality compact is produced.

The invention may have various modifications within the scope of the accompanying claims.

I claim:

1. In the manufacture of a compressed dry powder cake cosmetic, providing a container constituting a permanent support for receiving and rigidly holding the cake having a plurality of open holes in its bottom and false sides extending above the side edges of the support, filling the container provided by the support and its false sides with the powder mixture, settling the powder to a condensed loose mass, and thereafter pressing the powder into a cake on said support under a high pressure while the latter is supported upon a base providing channels for the escape of the air from the powder through the holes in the container.

2. In the manufacture of a substantially dry powder cake cosmetic, providing a rigid pan-like container constituting a permanent support for and capable of protecting the cake against breakage and having a plurality of distributed openings in the bottom thereof for the escape of air during pressing of the cake, providing extended false sides for the container, filling the container and said extended sides with the powder mixture, and compressing the powder into said container by progressively condensing the loose powder mass from the top of the mass downwardly toward the bottom of the container while allowing the free escape of air downwardly through the openings in said container bottom from between the powder particles as the latter are pressed closer together, the powder adjacent the bottom of the container remaining loose for the escape of air therethrough substantially until the completion of the pressing operation.

3. In the manufacture of a substantially dry powder cake cosmetic, providing a rigid container constituting a permanent support for and capable of protecting the cake against breakage and having a plurality of distributed openings in the bottom thereof for the escape of air during pressing of the cake, providing extended false sides for the container, filling the container and said extended sides with the powder mixture, compressing the powder into said container by progressively condensing the loose powder mass from the top of the mass downwardly toward the bottom of the container while allowing the free escape of air downwardly through the openings in said container bottom from between the powder particles as the latter are pressed closer together, the powder adjacent the bottom of the container remaining loose for the escape of air therethrough substantially until the completion of the pressing operation, and applying a suction through filter means disposed beneath the perforate bottom of the container during said pressing operation.

HERBERT HEINRICH.

REFERENCES CITED

The following references are of record in the file of this patent:

UNITED STATES PATENTS

| Number | Name | Date |
|---|---|---|
| 131,561 | Ransome | Sept. 24, 1872 |
| 1,018,949 | Williams | Feb. 27, 1912 |
| 1,370,294 | Dimons | Mar. 1, 1921 |
| 1,582,242 | Booty | Apr. 27, 1926 |
| 1,711,798 | Kronish | May 7, 1929 |
| 2,026,266 | Booty | Dec. 31, 1935 |
| 2,026,940 | Hendryx | Jan. 7, 1936 |
| 2,053,996 | Jones | Sept. 8, 1936 |
| 2,390,473 | Teichner | Dec. 4, 1945 |